United States Patent
Yang et al.

(10) Patent No.: US 11,483,165 B2
(45) Date of Patent: Oct. 25, 2022

(54) CERTIFICATE RENEWAL METHOD, APPARATUS, SYSTEM, MEDIUM, AND DEVICE

(71) Applicant: BEIJING BAISHANCLOUD TECHNOLOGY CO., LTD., Beijing (CN)

(72) Inventors: Yang Yang, Beijing (CN); Hui Miao, Beijing (CN)

(73) Assignee: BEIJING BAISHANCLOUD TECHNOLOGY CO., LTD., Beijing (CN)

(*) Notice: Subject to any disclaimer, the term of this patent is extended or adjusted under 35 U.S.C. 154(b) by 172 days.

(21) Appl. No.: 17/256,134

(22) PCT Filed: Jun. 25, 2019

(86) PCT No.: PCT/CN2019/092659
§ 371 (c)(1),
(2) Date: Dec. 24, 2020

(87) PCT Pub. No.: WO2020/001417
PCT Pub. Date: Jan. 2, 2020

(65) Prior Publication Data
US 2021/0126802 A1    Apr. 29, 2021

(30) Foreign Application Priority Data
Jun. 25, 2018   (CN) .......... 201810659585.6

(51) Int. Cl.
*H04L 9/32* (2006.01)
*H04L 9/08* (2006.01)

(52) U.S. Cl.
CPC ............ *H04L 9/3268* (2013.01); *H04L 9/083* (2013.01); *H04L 9/0891* (2013.01); *H04L 9/3265* (2013.01)

(58) Field of Classification Search
None
See application file for complete search history.

(56) References Cited

U.S. PATENT DOCUMENTS

| | | | |
|---|---|---|---|
| 2003/0182549 | A1 | 9/2003 | Hallin et al. |
| 2011/0113239 | A1 | 5/2011 | Fu et al. |

(Continued)

FOREIGN PATENT DOCUMENTS

| | | | |
|---|---|---|---|
| CN | 101572888 A | 11/2009 | |
| CN | 101771537 A | 7/2010 | |

(Continued)

OTHER PUBLICATIONS

Intellectual Property India The Examination Report for Application No. 202047056192 dated Dec. 30, 2021 5 pages.

(Continued)

*Primary Examiner* — Benjamin E Lanier
(74) *Attorney, Agent, or Firm* — Anova Law Group, PLLC

(57) ABSTRACT

A certificate renewal method includes a satellite certification authority (CA) receiving, from a central CA, permission configuration information including permission information for indicating that only renewal processes are executed, receiving a renewal request transmitted by a device, judging whether a renewal condition is satisfied, generating a new device certificate via a signing procedure implemented using a private key corresponding to a level 3 certificate of the satellite CA in response to determining that the renewal condition is satisfied, and transmitting the new device certificate to the device.

20 Claims, 3 Drawing Sheets

(56) References Cited

U.S. PATENT DOCUMENTS

| | | | |
|---|---|---|---|
| 2011/0302411 | A1 | 12/2011 | Liang et al. |
| 2012/0166796 | A1 | 6/2012 | Metke et al. |
| 2014/0013108 | A1 | 1/2014 | Pellikka et al. |
| 2015/0295712 | A1 | 10/2015 | Veugen |
| 2017/0134164 | A1 | 5/2017 | Haga et al. |
| 2017/0195124 | A1 | 7/2017 | Obaidi et al. |

FOREIGN PATENT DOCUMENTS

| | | |
|---|---|---|
| CN | 102137399 A | 7/2011 |
| CN | 103188248 A | 7/2013 |
| CN | 104168113 A | 11/2014 |
| CN | 107332858 A | 11/2017 |

OTHER PUBLICATIONS

World Intellectual Property Organization (WIPO) International Search Report for PCT/CN2019/092659 dated Aug. 27, 2019 5 Pages.
Intellectual Property Office of Singapore The Examination Report for Application No. 11202012583W dated Jul. 25, 2022 10 pages.

CERTIFICATE RENEWAL METHOD, APPARATUS, SYSTEM, MEDIUM, AND DEVICE

CROSS-REFERENCE TO RELATED APPLICATIONS

This application is a national stage entry under 35 U.S.C. § 371 of International Application No. PCT/CN2019/092659, filed on Jun. 25, 2019, which claims priority to Chinese Patent Application No. 201810659585.6 filed in the SIPO on Jun. 25, 2018 and entitled "CERTIFICATE RENEWAL METHOD, APPARATUS, AND SYSTEM," the disclosures of both of which are incorporated herein by reference in their entireties.

TECHNICAL FIELD

The present disclosure relates to the Internet technology, and in particular to a certificate renewal method, apparatus, system, medium and device.

BACKGROUND

With the rapid growth of the Internet of Things (IoT), the number of IoT devices has also increased rapidly, bringing considerable attention to the security of IoT devices.

At present, the security problems of the IoT devices mainly focus on data encryption, identity authentication or the like. Both the data encryption and the identity authentication are realized based on a public key infrastructure (PKI) system at present. In the existing PKI security system, each IoT device acquires, from a certificate authority (CA), a certificate issued by the CA, and also acquires a private key corresponding to this certificate, wherein the certificate is used to identify the identity of the IoT device. In the subsequent processing process, the IoT device needs to use the certificate and the private key for corresponding processing if it is needed to perform identity authentication and data encryption.

For example, when it is needed to perform identity authentication of an IoT device, the IoT device uses its private key signature to apply to a verifier for identity authentication, and the verifier verifies the signature of the IoT device by using the certificate of the IoT device so as to confirm the identity of the IoT device.

As another example, during data encryption and transmission, a data sender encrypts data by using a certificate of an IoT device and then sends the encrypted data to the IoT device, and the IoT device receives the encrypted data and then decrypts the encrypted data by using the private key of the IoT device.

It can be known from the identity authentication process and the data encryption and transmission process that the main factor related to the security of the IoT device is the validity of the certificate. The certificate is time-limited and needs to be renewed when it reaches the time limit for use. If the certificate is not renewed, the certificate will become invalid, thus endangering the security of the IoT device.

The certificate renewal methods in the related art have the following disadvantages.

1. Since IoT devices are geographically dispersed widely, certificates cannot be renewed in time, causing the certificates to become invalid.

2. Certificates are renewed in a centralized manner, that is, only one central CA is used to realize certificate renewal, and the certificates of all IoT devices are renewed in this central CA, so that the processing burden on the central CA is large. Particularly in a case where the number of IoT devices increases rapidly, the central CA is prone to failure under the processing burden, thus affecting the experience of certificate renewal users.

3. Since renewal is applied to the central CA manually, the renewal efficiency is low.

Moreover, the existing CA certificate systems are basically two-level systems, specifically: a central CA generates a root certificate and a root private key corresponding to the root certificate, and the root certificate is physically isolated from the root private key. A level 2 certificate is generated based on the root private key, and a level 2 private key corresponding to the level 2 certificate is generated. The central CA uses this level 2 private key to issue other certificates for the IoT device. For example, the central CA also uses this level 2 private key to issue a renewal certificate for the IoT device. Generally, the central CA does not physically isolate the level 2 private key remotely, and stores the level 2 private key in a security chip for convenient and quick calling. The certificate issued by using the level 2 private key is generally not allowed to continue to have an issuing function. For example, the certificate of the IoT device can only be used for its own services and cannot be used to continuously issue other certificates.

SUMMARY

The present disclosure provides a certificate renewal method, apparatus, system and medium.

In accordance with one aspect of the present disclosure, a certificate renewal method is provided, including:

receiving, by a satellite certification authority (CA), permission configuration information from a central CA, the permission configuration information including permission information for indicating that only renewal processes are executed;

receiving, by the satellite CA, a renewal request transmitted by a device;

judging whether a renewal condition is satisfied;

generating a new device certificate if it is determined that the renewal condition is satisfied, the new device certificate being generated by signing procedure implemented using a private key corresponding to a level 3 certificate of the satellite CA; and transmitting the generated new device certificate to the device.

The certificate renewal method is further characterized in that:

before the receiving, by the satellite CA, a renewal request transmitted by a device, the method further includes: receiving, by the satellite CA, a device identification set from the central CA; and before the judging whether a renewal condition is satisfied, the method further includes: determining whether the identification of the device belongs to the device identification set or not.

The certificate renewal method is further characterized in that:

the renewal request further includes a certificate signature request, and the certificate signature request further includes an expiration time; and the renewal condition includes: the time difference between the current time and the expiration time in the certificate signature request is less than the preset time period.

The certificate renewal method is further characterized in that:

the satellite CA receives the renewal request transmitted by the device together with the current certificate of the device;

the renewal request further includes a certificate signature request; and the renewal condition comprises: information in the certificate signature request is the same as information of current certificate of the device stored in the satellite CA.

The certificate renewal method is further characterized in that:

the method further includes:

receiving, by the satellite CA, the level 3 certificate from the central CA, the level 3 certificate being generated by the central CA according to unique identification information of the satellite CA.

The certificate renewal method is further characterized in that:

the satellite CA includes an issuing unit and a private key management unit;

the issuing unit is configured to transmit a connection request to the private key management unit when it is judged that the satellite CA needs to generate the new device certificate, and transmit the certificate signature request to the private key management unit after it is successfully connected to the private key management unit; and is further configured to receive the new device certificate from the private key management unit; and the private key management unit is configured to receive a connection request from the issuing unit, sign the certificate signature request by using the private key corresponding to the level 3 certificate of the satellite CA after the connection with the issuing unit is established, and transmit the new device certificate generated by signing procedure to the issuing unit;

or, the satellite CA includes an issuing unit; and the issuing unit is configured to transmit a connection request to the private key management unit when it is judged that the satellite CA needs to generate the new device certificate, and transmit the certificate signature request to the private key management unit after it is successfully connected to the private key management unit; and is further configured to receive the new device certificate from the private key management unit, the new device certificate being generated by the private key management unit signing the certificate signature request by using the private key corresponding to the level 3 certificate of the satellite CA after the private key management unit receives the connection request from the issuing unit and establishes connection with the issuing unit.

In accordance with another aspect of the present disclosure, a certificate renewal apparatus is provided, applied to a satellite CA, including:

a first receiving module configured to receive permission configuration information from a central CA, the permission configuration information including permission information for indicating that only renewal processes are executed;

a second receiving module configured to receive a renewal request transmitted by a device;

a judgment module configured to judge whether a renewal condition is satisfied;

a generation module configured to generate a new device certificate when the judgment module determines that the renewal condition is satisfied, the new device certificate being generated by signing procedure implemented using a private key corresponding to a level 3 certificate of the satellite CA; and a transmission module configured to transmit the generated new device certificate to the device.

The certificate renewal apparatus is further characterized in that:

the apparatus further includes:

a third receiving module configured to receive a device identification set from the central CA before the second receiving module receives the renewal request transmitted by the device; and a determination module configured to determine whether the identification of the device belongs to the device identification set or not, and trigger the judgment module after it is determined that the identification of the device belongs to the device identification set.

The certificate renewal apparatus is further characterized in that:

the renewal request further includes a certificate signature request, and the certificate signature request further includes an expiration time; and the renewal condition includes: the time difference between the current time and the expiration time in the certificate signature request is less than the preset time period.

The certificate renewal apparatus is further characterized in that:

the second receiving module is further configured to receive the renewal request transmitted by the device together with the current certificate of the device;

the renewal request further comprises a certificate signature request; and the renewal condition comprises: information in the certificate signature request is the same as information of current certificate of the device stored in the satellite CA.

The certificate renewal apparatus is further characterized in that:

the apparatus further includes:

a fourth receiving module configured to receive the level 3 certificate from the central CA, the level 3 certificate being generated by the central CA according to unique identification information of the satellite CA.

The certificate renewal apparatus is further characterized in that:

the apparatus further includes an issuing unit and a private key management unit;

the issuing unit is configured to transmit a connection request to the private key management unit when it is judged that the satellite CA needs to generate the new device certificate, and transmit the certificate signature request to the private key management unit after it is successfully connected to the private key management unit; and is further configured to receive the new device certificate from the private key management unit; and the private key management unit is configured to receive a connection request from the issuing unit, sign the certificate signature request by using the private key corresponding to the level 3 certificate of the satellite CA after the connection with the issuing unit is established, and transmit the new device certificate generated by signing procedure to the issuing unit;

or, the apparatus includes an issuing unit; and the issuing unit is configured to transmit a connection request to the private key management unit when it is judged that the satellite CA needs to generate the new device certificate, and transmit the certificate signature request to the private key management unit after it is successfully connected to the private key management unit; and is further configured to receive the new device certificate from the private key management unit, the new device certificate being generated by the private key management unit signing the certificate signature request by using the private key corresponding to the level 3 certificate of the satellite CA after the private key management unit receives the connection request from the issuing unit and establishes connection with the issuing unit.

In accordance with another aspect of the present disclosure, a certificate renewal system is provided, including a central CA and at least one satellite CA, the satellite CA including the certificate renewal apparatus described above.

In accordance with another aspect of the present invention, a computer-readable storage medium is provided, the computer-readable storage medium storing computer programs that implement, when executed, the steps in the method described above.

In accordance with another aspect of the present disclosure, a computer device is provided, including a processor, a memory and computer programs that are stored on the memory, the processor implementing the steps in the method described above when executing the computer programs.

In the present disclosure, a distributed CA structure and satellite CAs with limited function are provided, and the satellite CAs with limited function share the processing burden with a central CA. Moreover, an IoT device is allowed to access to the near satellite CA so as to implement certificate renewal quickly and efficiently.

BRIEF DESCRIPTION OF THE DRAWINGS

The accompanying drawings constituting a part of the present disclosure are used for providing further understanding of the present disclosure. Illustrative embodiments of the present disclosure and description thereof are used for explaining the present disclosure, rather than constituting any inappropriate limitations to the present disclosure. In the accompanying drawings.

DETAILED DESCRIPTION OF THE EMBODIMENTS

To make the objectives, technical solutions and advantages of the embodiments of the present disclosure clearer, the technical solutions in the embodiments of the present disclosure will be described clearly and completely in conjunction with the accompany drawings in the embodiments of the present disclosure. Apparently, the embodiments described herein are some but not all of the embodiments of the present disclosure. All other embodiments obtained based on the embodiments of the present disclosure by a person of ordinary skill in the art without paying any creative effort shall fall into the protection scope of the present disclosure. It is to be noted that the embodiments in the present disclosure and the features in the embodiments can be combined with each other if not conflicted.

The device involved in the present disclosure may be a typical IoT device, also referred to as a device herein.

Figure 1:
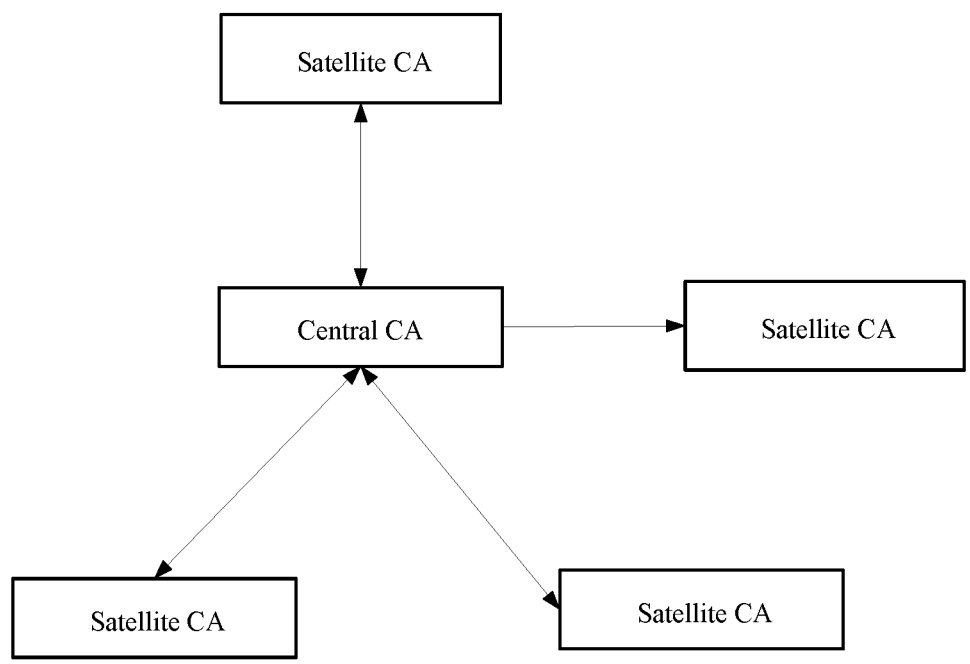
FIG. 1 is a schematic structure diagram showing CA distribution in an example according to an exemplary embodiment.

As shown in FIG. 1, in the present disclosure, CAs are of a distributed structure, including a central CA and more than one satellite CA connected to the central CA. The satellite CAs may be arranged according to the geographical location (for example, more satellite CAs are arranged in a hotspot area), or may be arranged according to the device density (for example, more satellite CAs are arranged in an area with a higher device density). If there are more satellite CAs, the user experience of IoT devices is better.

Figure 2:
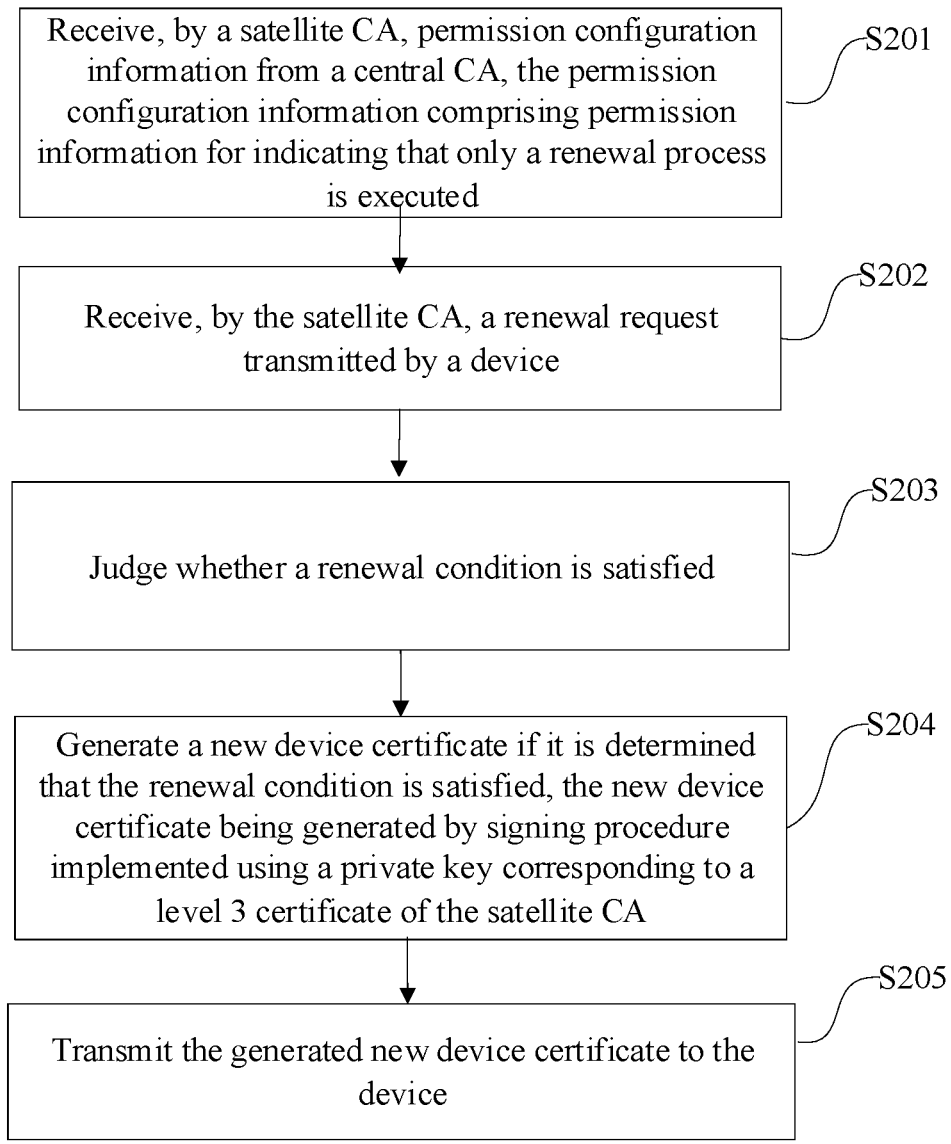
FIG. 2 is a flowchart of a certificate renewal method in an example according to an exemplary embodiment.

As shown in FIG. 2, the certificate renewal method includes the following steps.

Step 201: A satellite CA receives permission configuration information from a central CA, the permission configuration information including permission information for indicating that only a renewal process is executed.

Step 202: The satellite CA receives a renewal request transmitted by a device.

Step 203: It is judged whether a renewal condition is satisfied.

Step 204: A new device certificate is generated if it is determined that the renewal condition is satisfied, the new device certificate being generated by signing procedure implemented using a private key corresponding to a level 3 certificate of the satellite CA.

Step 205: The generated new device certificate is transmitted to the device.

The method further includes a step 206: the satellite CA reports this issuing behavior to the central CA, and receives, from the central CA, information indicating confirmation of this issuing behavior. During further verification, the central CA confirms the illegal renewal as invalid renewal. In this way, even if the private key of the level 3 certificate is leaked, the forged certificate cannot be used, so that the security is ensured.

In the present disclosure, the concept of the level 3 certificate is introduced based on the existing two-level system, that is, the level 2 private key of the CA is used to issue a level 3 certificate that can be used to continuously issue other certificates. The satellite CA can use this level 3 certificate, but the function of the satellite CA is limited. The satellite CA is only responsible for certificate renewal. During the first issuing of a certificate, a device needs to interact with the central CA, and the first issuing of the certificate is processed by the central CA. In addition, the satellite CA has no right to suspend the certificate.

Before the step 202, the method further includes: receiving, by the satellite CA, a device identification set from the central CA. Before the step 203, the method further includes: determining whether the identification of the device belongs to the device identification set or not. Therefore, the satellite CA is limited not only in function, but also in terms of objects being processed. That is, a satellite CA can only renew certificates of those devices allocated to this satellite CA by the central CA, and cannot renew certificates of other devices not within the device identification set.

The renewal condition in the step 203 includes at least one of the following conditions. In a typical case, the renewal condition includes the following two conditions.

Condition 1: the renewal request further includes a certificate signature request, and the certificate signature request further includes an expiration time. The renewal condition includes: the time difference between the current time and the expiration time in the certificate signature request is less than the preset time period.

Condition 2: the satellite CA receives the renewal request transmitted by the device together with the current certificate of the device. The renewal request further includes a certificate signature request. The renewal condition includes: the information in the certificate signature request is the same as the information of the current certificate of the device stored in the satellite CA.

The satellite CA receives the current certificate of the device upon receiving the renewal request transmitted by the device, so the expiration time of the certificate is prevented from being maliciously tempered, and the accuracy of renewal is ensured.

The information in the renewal condition refers to the well-known parameter information, such as public key, common name, expiration data and certificate usage. The renewal request further includes a signature value, and the renewal condition further includes: the certificate signature request is verified successfully by using the signature value.

In the step 203, when it is judged that the renewal condition is not satisfied, renewal rejection information is transmitted to the device.

In the step 204, the level 3 certificate is generated by the central CA according to unique identification information of the satellite CA, and the level 3 certificate is received by the satellite CA from the central CA. Therefore, the level 3 certificates of different satellite CAs are different.

In this method, security measures are taken in the satellite CA to ensure the security of the private key corresponding to the level 3 certificate. Specifically, a processing mode of isolating the private key from issuing is used. In the prior art, a same chip is used to store the private key and issue the certificate. In this method, the issuing unit and the private key management unit are located in different entities. The specific implementation is one of the following manners.

Manner 1 the satellite CA includes an issuing unit and a private key management unit.

The issuing unit is configured to transmit a connection request to the private key management unit when it is judged that the satellite CA needs to generate a new device certificate, and transmit the certificate signature request to the private key management unit after it is successfully connected to the private key management unit. The issuing unit is further configured to receive the new device certificate from the private key management unit.

The private key management unit is configured to receive a connection request from the issuing unit, sign the certificate signature request by using the private key corresponding to the level 3 certificate of the satellite CA after the connection with the issuing unit is established, and transmit the new device certificate generated by the above signing procedure to the issuing unit.

Manner 2

The satellite CA includes an issuing unit, and the private key management unit is located in an entity outside the satellite CA, for example, being located in the central CA.

The issuing unit is configured to transmit a connection request to the private key management unit when it is judged that the satellite CA needs to generate a new device certificate, and transmit the certificate signature request to the private key management unit after it is successfully connected to the private key management unit. The issuing unit is further configured to receive the new device certificate from the private key management unit, the new device certificate being generated by the private key management unit signing the certificate signature request by using the private key corresponding to the level 3 certificate of the satellite CA after the private key management unit receives the connection request from the issuing unit and establishes connection with the issuing unit.

The private key management unit is configured to receive a connection request from the issuing unit, sign the certificate signature request by using the private key corresponding to the level 3 certificate of the satellite CA after the connection with the issuing unit is established, and transmit the new device certificate generated by the above signing procedure to the issuing unit.

When the issuing unit is connected to the private key management unit, the issuing unit can be successfully connected to the private key management unit only after it is verified. This verification process includes at least one of the following operations: TLS bidirectional authentication and IP white list screening.

The satellite CA reports all renewal behaviors to the central CA, so that it is convenient for the central CA to perform security auditing according to the renewal behavior of each satellite CA.

This method can realize decentralization of the central CA and reduce the processing burden on the central CA. When a device certificate is to be renewed, it is unnecessary to connect the unique central CA as in the prior art, so that the processing burden on the central CA can be reduced. Moreover, since the satellite CA is limited in function, a device is connected only when certificate renewal is needed, so that the security problems caused by excessive functions of the satellite CA are avoided.

Figure 3:
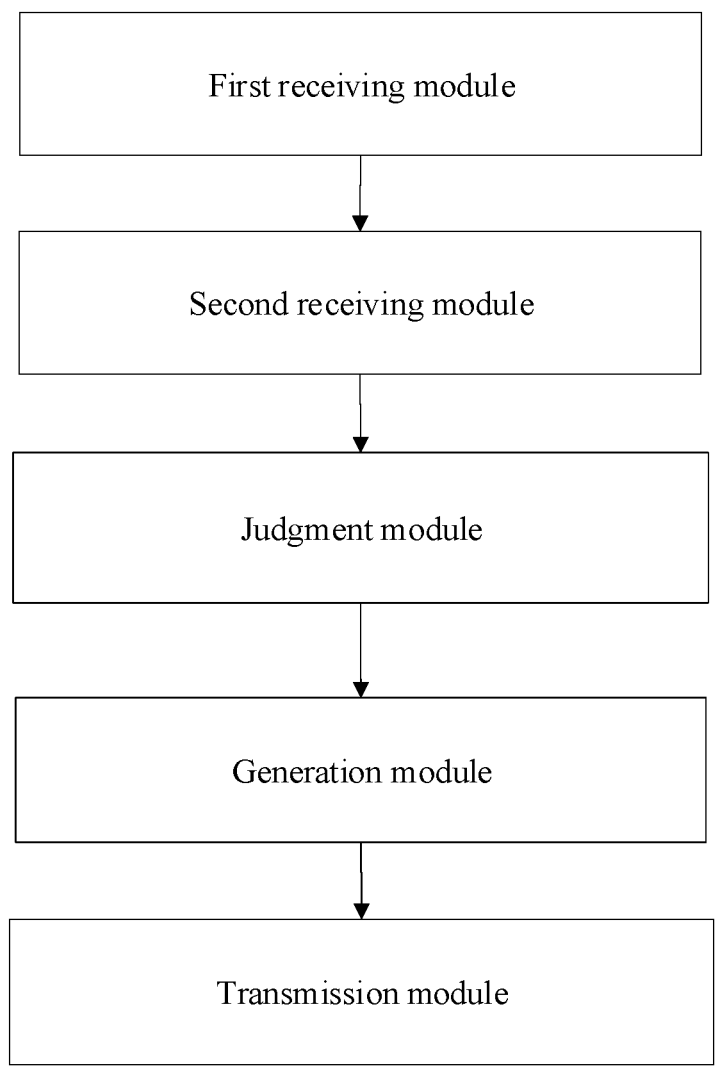
FIG. 3 is a structure diagram of a certificate renewal apparatus in an example according to an exemplary embodiment.

FIG. 3 is a structure diagram of a certificate renewal apparatus in an example. A satellite CA includes a certificate renewal apparatus. The certificate renewal apparatus includes:

a first receiving module configured to receive permission configuration information from a central CA, the permission configuration information including permission information for indicating that only a renewal process is executed;

a second receiving module configured to receive a renewal request transmitted by a device;

a judgment module configured to judge whether a renewal condition is satisfied;

a generation module configured to generate a new device certificate when the judgment module determines that the renewal condition is satisfied, the new device certificate being generated by signing procedure implemented using a private key corresponding to a level 3 certificate of the satellite CA; and a transmission module configured to transmit the generated new device certificate to the device.

Wherein, the apparatus further includes:

a third receiving module configured to receive a device identification set from the central CA before the second receiving module receives the renewal request transmitted by the device; and a determination module configured to determine whether the identification of the device belongs to the device identification set or not, and trigger the judgment module after it is determined that the identification of the device belongs to the device identification set.

Wherein,

The renewal condition includes at least one of the following conditions. In a typical case, the renewal condition includes the following two conditions.

Condition 1: the renewal request further includes a certificate signature request, and the certificate signature request further includes an expiration time; and, the renewal condition includes: the time difference between the current time and the expiration time in the certificate signature request is less than the preset time period.

Condition 2: the second receiving module is further configured to receive the renewal request transmitted by the device together with the current certificate of the device. The renewal request further includes a certificate signature request; and the renewal condition includes: the information in the certificate signature request is the same as the information of the current certificate of the device stored in the satellite CA. The second receiving module receives the current certificate of the device upon receiving the renewal request transmitted by the device, so the expiration time of the certificate is prevented from being maliciously tempered, and the accuracy of renewal is ensured.

The information in the renewal condition refers to the well-known parameter information, such as public key, common name, expiration data and certificate usage. The renewal request further includes a signature value, and the renewal condition further includes: the certificate signature request is verified successfully by using the signature value.

The apparatus further includes: a fourth receiving module configured to receive the level 3 certificate from the central CA, the level 3 certificate being generated by the central CA according to unique identification information of the satellite CA.

The apparatus may implement the issuing function by one of the following manners.

Manner 1

The apparatus further includes an issuing unit and a private key management unit.

The issuing unit is configured to transmit a connection request to the private key management unit when it is judged that the satellite CA needs to generate the new device certificate, and transmit the certificate signature request to the private key management unit after it is successfully connected to the private key management unit. The issuing unit is further configured to receive the new device certificate from the private key management unit.

The private key management unit is configured to receive a connection request from the issuing unit, sign the certificate signature request by using the private key corresponding to the level 3 certificate of the satellite CA after the connection with the issuing unit is established, and transmit the new device certificate generated by the above signing procedure to the issuing unit.

Manner 2

The apparatus includes an issuing unit. The issuing unit is configured to transmit a connection request to the private key management unit when it is judged that the satellite CA needs to generate a new device certificate, and transmit the certificate signature request to the private key management unit after it is successfully connected to the private key management unit. The issuing unit is further configured to receive the new device certificate from the private key management unit, the new device certificate being generated by the private key management unit signing the certificate signature request by using the private key corresponding to the level 3 certificate of the satellite CA after the private key management unit receives the connection request from the issuing unit and establishes connection with the issuing unit.

The apparatus further includes a report module configured to report all renewal behaviors to the central CA, so that it is convenient for the central CA to perform security auditing according to the renewal behavior of each satellite CA.

An embodiment of the present disclosure further discloses a certificate renewal system. As shown in FIG. 1, the system includes a central CA and at least one satellite CA. The satellite CA includes the certificate renewal apparatus described above. In this distributed CA structure, satellite CAs with limited function are provided, and the satellite CAs share the processing burden with the central CA. Accordingly, an IoT device is allowed to access a nearby satellite CA so as to implement certificate renewal quickly and efficiently.

Figure 4:
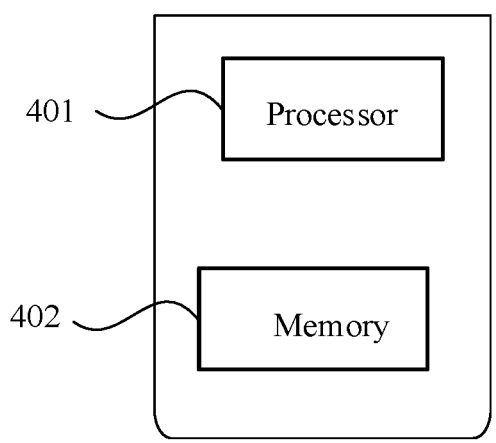
FIG. 4 is a block diagram of a computer device according to an exemplary embodiment.

FIG. 4 is a block diagram of a computer device for certificate renewal according to an exemplary embodiment. For example, the device may be provided as a server. With reference to FIG. 4, the device includes a processor 401. There may be one or more processors as needed. The device further includes a memory 402 configured to store instructions (e.g., applications) executable by the processor. There may be one or more memories as needed. There may be one or more stored applications. The processor 401 is configured to execute the instructions so as to execute the certificate renewal method described above.

It should be understood by those skilled in the art that the embodiments of the present disclosure may be provided as methods, apparatuses (devices) or computer program products. Therefore, the present disclosure may be in form of full hardware embodiments, full software embodiments, or embodiments of combination of software and hardware. Moreover, the present disclosure may be in form of computer program products that are implemented on one more computer-available storage mediums containing computer-available program codes. The computer storage mediums include volatile/nonvolatile removable/non-removable mediums that are implemented in any methods or technologies for storing information (such as computer-readable instructions, data structures, program modules or other data), including but not limited to, RAMs, ROMs, EEPROMs, flash memories or other memory technologies, CD-ROMs, digital versatile disks (DVDs) or other optical disk storages, cassettes, magnetic tapes, magnetic disk storages or other magnetic storage devices, or any other mediums that can be used to store desired information and can be accessed by computers, or the like. In addition, as well-known to a person of ordinary skill in the art, the communication mediums generally contain computer-readable instructions, data structures, program modules or other data in modulation data signals such as carriers or other transmission mechanisms, and may include any information transfer mediums.

The present disclosure is described with reference to the flowchart and/or block diagram of the method, apparatus (device) and computer program product according to the embodiments of the present disclosure. It should be understood that each flow and/or block of the flowchart and/or the block diagram as well as a combination of flows and/or blocks of the flowchart and/or the block diagram may be implemented by computer program instructions. These computer program instructions may be provided to a general-purpose computer, a dedicated computer, an embedded processor or processors of other programmable data processing apparatuses to generate a machine, such that an apparatus configured to implement functions of one or more flows in the flowchart and/or one or more blocks in the block diagram may be generated by the instructions executed on a computer or processors of other programmable data processing apparatuses.

These computer program instructions may also be stored in a computer readable memory which can direct the computer or other programmable data processing apparatuses to operate in a specific mode, so as to enable the instructions stored in the computer readable memory to generate a manufacture product containing an instruction apparatus. The instruction apparatus can implement the function designated in one or more flows in the flowchart and/or one or more blocks in the block diagram.

These computer program instructions may also be loaded in a computer or other programmable data processing apparatuses, so as to perform a series of operation steps on the computer or other programmable data processing apparatuses to generate processing implemented by the computer, thus instructions executed on the computer or other programmable apparatuses can provide steps for implementing functions designated in one flow or more flows in the flowchart and/or one or more blocks in the block diagram.

In the present disclosure, the term "comprise," "include" or any other variant thereof is non-exclusive, so that an object or a device containing a series of elements not only contains these elements, but also contains other elements not listed clearly, or further contains inherent elements of this object or device. Without more restrictions, an element associated with the term "comprising . . . " does not exclude other identical elements in the object or device including this element.

Although the preferred embodiments of the present disclosure have been described, those skilled in the art can make additional alterations and modifications to these embodiments once the basic creative concepts have been learnt. Therefore, the appended claims are intended to encompass the preferred embodiments and all alterations and modifications falling in the scope of the present disclosure.

Apparently those skilled in the art can make various alterations and variations to the present disclosure without departing from the spirit and scope of the present disclosure. Thus, if these alterations and variations to the present disclosure fall into the scope of the appended claims of the present disclosure and technical equivalents thereof, the present disclosure is intended to encompass these alterations and variations.

INDUSTRIAL APPLICABILITY

In the present disclosure, a distributed CA structure and satellite CAs with limited function are provided, and the satellite CAs with limited function share the processing burden with a central CA. Moreover, an IoT device is allowed to access to the near satellite CA so as to implement certificate renewal quickly and efficiently.

The invention claimed is:

1. A certificate renewal method comprising:
   receiving, by a satellite certification authority (CA), permission configuration information from a central CA, the permission configuration information including permission information for indicating that only renewal processes are executed;
   receiving, by the satellite CA, a renewal request transmitted by a device;
   judging, by the satellite CA, whether a renewal condition is satisfied;
   in response to determining that the renewal condition is satisfied, generating a new device certificate via a signing procedure implemented using a private key corresponding to a level 3 certificate of the satellite CA; and
   transmitting the new device certificate to the device.

2. The certificate renewal method according to claim 1, further comprising:
   before receiving the renewal request, receiving, by the satellite CA, a device identification set from the central CA; and
   before judging whether the renewal condition is satisfied, determining whether an identification of the device belongs to the device identification set.

3. The certificate renewal method according to claim 1, wherein:
   the renewal request includes a certificate signature request including an expiration time; and
   the renewal condition includes that a time difference between a current time and the expiration time is less than a preset time period.

4. The certificate renewal method according to claim 1, further comprising:
   receiving, by the satellite CA, a current certificate of the device together with the renewal request;
   wherein:
   the renewal request includes a certificate signature request; and
   the renewal condition includes that information in the certificate signature request is same as information of the current certificate of the device stored in the satellite CA.

5. The certificate renewal method according to claim 1, further comprising:
   receiving, by the satellite CA, the level 3 certificate from the central CA, the level 3 certificate being generated by the central CA according to unique identification information of the satellite CA.

6. The certificate renewal method according to claim 1, further comprising:
   transmitting, by an issuing unit of the satellite CA in response to the satellite CA needing to generate the new device certificate, a connection request to a private key management unit of the satellite CA;
   receiving, by the private key management unit, the connection request from the issuing unit;
   transmitting, by the issuing unit, a certificate signature request to the private key management unit after a connection between the issuing unit and the private key management unit is established;
   receiving, by the private key management unit after the connection is established, the certificate signature request;
   performing, by the private key management unit, the signing procedure on the certificate signature request using the private key corresponding to the level 3 certificate of the satellite CA to generate the new device certificate;
   transmitting, by the private key management unit, the new device certificate to the issuing unit; and
   receiving, by the issuing unit, the new device certificate transmitted by the private key management unit.

7. The certificate renewal method according to claim 1, further comprising:
   transmitting, by an issuing unit of the satellite CA in response to the satellite CA needing to generate the new device certificate, a connection request to a private key management unit;

transmitting, by the issuing unit, a certificate signature request to the private key management unit after a connection with the private key management unit is established; and receiving, by the issuing unit, the new device certificate from the private key management unit, the new device certificate being generated by the private key management unit performing the signing procedure on the certificate signature request using the private key corresponding to the level 3 certificate of the satellite CA after the private key management unit receives the connection request from the issuing unit and establishes the connection.

8. A non-transitory computer-readable storage medium storing a computer program that, when executed by a processor, causes the processor to perform the method according to claim 1.

9. A computer device comprising:
a processor; and
a memory storing a computer program that, when executed by the processor, causes the processor to:
receive permission configuration information from a central certification authority (CA), the permission configuration information including permission information for indicating that only renewal processes are executed;
receive a renewal request transmitted by a device;
judge whether a renewal condition is satisfied;
in response to determining that the renewal condition is satisfied, generate a new device certificate via a signing procedure implemented using a private key corresponding to a level 3 certificate of a satellite CA; and
transmit the new device certificate to the device.

10. The computer device according to claim 9, wherein the computer program further causes the processor to:
before receiving the renewal request, receive a device identification set from the central CA; and
before judging whether the renewal condition is satisfied, determine whether an identification of the device belongs to the device identification set.

11. The computer device according to claim 9, wherein:
the renewal request includes a certificate signature request including an expiration time; and
the renewal condition includes that a time difference between a current time and the expiration time is less than a preset time period.

12. The computer device according to claim 9, wherein:
the computer program further causes the processor to receive a current certificate of the device together with the renewal request;
the renewal request includes a certificate signature request; and
the renewal condition includes that information in the certificate signature request is same as information of the current certificate of the device stored in the satellite CA.

13. The computer device according to claim 9, wherein the computer program further causes the processor to:
receive the level 3 certificate from the central CA, the level 3 certificate being generated by the central CA according to unique identification information of the satellite CA.

14. The computer device according to claim 9, wherein the computer program further causes the processor to:
cause an issuing unit of the satellite CA to:

transmit, in response to the satellite CA needing to generate the new device certificate, a connection request to a private key management unit of the satellite CA;
transmit a certificate signature request to the private key management unit after a connection between the issuing unit and the private key management unit is established; and
receive the new device certificate transmitted by the private key management unit; and
cause the private key management unit to:
receive the connection request from the issuing unit;
receive, after the connection is established, the certificate signature request;
perform the signing procedure on the certificate signature request using the private key corresponding to the level 3 certificate of the satellite CA to generate the new device certificate; and
transmit the new device certificate to the issuing unit.

15. The computer device according to claim 9, wherein the computer program further causes the processor to cause an issuing unit of the satellite CA to:
transmit, in response to the satellite CA needing to generate the new device certificate, a connection request to a private key management unit;
transmit a certificate signature request to the private key management unit after a connection with the private key management unit is established; and
receive the new device certificate from the private key management unit, the new device certificate being generated by the private key management unit signing the certificate signature request using the private key corresponding to the level 3 certificate of the satellite CA after the private key management unit receives the connection request from the issuing unit and establishes the connection.

16. A certificate renewal system comprising:
a central certification authority (CA); and
a satellite CA including a hardware processor configured to:
receive permission configuration information from the central CA, the permission configuration information including permission information for indicating that only renewal processes are executed;
receive a renewal request transmitted by a device;
judge whether a renewal condition is satisfied;
in response to determining that the renewal condition is satisfied, generate a new device certificate via a signing procedure implemented using a private key corresponding to a level 3 certificate of the satellite CA; and
transmit the new device certificate to the device.

17. The certificate renewal system according to claim 16, wherein the hardware processor is further configured to:
before receiving the renewal request, receive a device identification set from the central CA; and
before judging whether the renewal condition is satisfied, determine whether an identification of the device belongs to the device identification set.

18. The certificate renewal system according to claim 16, wherein:
the renewal request includes a certificate signature request including an expiration time; and
the renewal condition includes that a time difference between a current time and the expiration time is less than a preset time period.

19. The certificate renewal system according to claim 16, wherein:
- the hardware processor is further configured to receive a current certificate of the device together with the renewal request;
- the renewal request includes a certificate signature request; and
- the renewal condition includes that information in the certificate signature request is same as information of the current certificate of the device stored in the satellite CA.

20. The certificate renewal system according to claim 16, wherein the hardware processor is further configured to:
- receive the level 3 certificate from the central CA, the level 3 certificate being generated by the central CA according to unique identification information of the satellite CA.

* * * * *